US006831604B2

(12) United States Patent
Obara

(10) Patent No.: US 6,831,604 B2
(45) Date of Patent: Dec. 14, 2004

(54) OPTICAL CONTROL ELECTROMAGNETIC WAVE CIRCUIT

(75) Inventor: Noriaki Obara, Communications Research Laboratory, Independent Administrative Institution 4-2-1 Nukui-kitamachi, Koganei, Tokyo 184-8795 (JP)

(73) Assignees: Communications Research Laboratory Independent Administrative Institution, Tokyo (JP); Noriaki Obara, Tokyo (JP)

( * ) Notice: Subject to any disclaimer, the term of this patent is extended or adjusted under 35 U.S.C. 154(b) by 44 days.

(21) Appl. No.: 10/015,615

(22) Filed: Dec. 17, 2001

(65) Prior Publication Data

US 2003/0021075 A1 Jan. 30, 2003

(30) Foreign Application Priority Data

Jun. 25, 2001 (JP) ...................................... 2001-190863

(51) Int. Cl.[7] ............................ H01Q 1/36; G02B 3/00
(52) U.S. Cl. ................................ 343/700 MS; 359/108
(58) Field of Search .......................... 343/700 MS, 876; 359/108, 244, 107

(56) References Cited

U.S. PATENT DOCUMENTS 5,880,862 A * 3/1999 Hiraga et al. ............... 359/108
6,417,807 B1 * 7/2002 Hsu et al. ............ 343/700 MS

FOREIGN PATENT DOCUMENTS

| | | |
|---|---|---|
| JP | 03-093277 | 4/1991 |
| JP | 06-252532 | 9/1994 |
| JP | 11-176238 | 7/1999 |
| JP | 2000-255165 | 9/2000 |
| JP | 2001-005942 | 1/2001 |
| JP | 2001-230622 | 8/2001 |

OTHER PUBLICATIONS

JPO Office Action for corresponding Japanese application 2001–190863.

* cited by examiner

*Primary Examiner*—James Vannucci

(57) ABSTRACT

An optical control electromagnetic wave circuit comprises a unit composed of a semiconductor layer, a transparent substrate, and a transparent grounded conductive layer and a displaying unit. The semiconductor layer is formed on the transparent substrate, and the photoconductive layer is formed on the opposite surface of the transparent substrate. The displaying unit faces the transparent grounded layer. The shape of the radio wave circuit which is displayed on the displaying unit is mapped on the semiconductor layer to form the radio wave circuit.

It can be realized to dynamically change the radio wave circuit by changing the shape of the radio wave circuit displayed on the displaying unit. The radio wave circuit can be provided freely and flexibly.

15 Claims, 14 Drawing Sheets

OPTICAL CONTROL ELECTROMAGNETIC WAVE CIRCUIT

CROSS REFERENCE TO RELATED APPLICATION

This application claims Japanese Patent Application No.2001-190863, filed in Jun. 25, 2001, the contents of which are incorporated herein by reference.

BACKGROUND OF THE INVENTION

1. Field of the Invention

The present invention relates to an optical control electromagnetic wave circuit. It can change dynamically and freely an electromagnetic wave circuit, when another electromagnetic wave circuit for changing such as a microwave circuit is provided.

2. Description of the Related Art

As disclosed in this specification, the present inventor is developing a microwave circuit comprising a structure totally different from a conventional microwave circuit. According to the microwave circuit under development, an antenna provided with functions which has not been realized by any conventional antennas can be provided.

A major feature of this antenna under development is the ability to dynamically change the shape of antenna elements, which will be described later.

As a prior art of the present invention, Japanese Patent Application Laid Open No. 2001-230622 shows an antenna of which characteristics is changeable dynamically. The prior art is also opened with internet (info@campuscreate.com).

The prior art adopts a configuration using a semiconductor as an antenna element so that the antenna characteristic can be changed according as the antenna is irradiated with light or when not irradiated with light. More specifically, the following three configurations are presented in the prior art.

(1) Configuration shown in FIG. 13A

As shown in FIG. 13A, in a case that the elements of a dipole antenna are semiconductors 201, a surface resistance value of the semiconductors decreases when the antenna is irradiated with light 204, which causes the semiconductors to operate as the antenna, and the semiconductors are changed to substance similar to insulator when the antenna is not irradiated, which causes the semiconductors not to operate as the antenna. Reference numeral 202 shows radio wave irradiated to the antenna.

(2) Configuration shown in FIG. 13B

As shown in FIG. 13B, in a case that a semiconductor is placed at an opening of a slot antenna, the semiconductor operates as the antenna when the antenna is not irradiated with light and the semiconductor does not operate as the antenna when the antenna is irradiated with light.

(3) Configuration shown in FIG. 13C

As shown in FIG. 13C, in a case that the elements of a dipole antenna are semiconductors, when the antenna is irradiated with light over a wide range of light such as light (1) 207, the semiconductors operate at a low frequency and when the antenna is irradiated with light over a narrow range of light such as light (2) 208, the semiconductors operate at a high frequency.

The prior art is a particularly excellent invention, but the invention adopts a configuration using semiconductors only for an antenna section while using a conventional metallic micro strip line for a power supply line, etc. and therefore the invention has a problem that, once created, changing the antenna structure is impossible, therefore its use is limited.

That is, the prior art adopts a configuration as shown in FIG. 14 that a semiconductor element 212 operating as an antenna is placed on a power supply line (micro strip line) 210 at right angles to the power supply line so that power is supplied to the semiconductor element by electromagnetic coupling between the micro strip line and the semiconductor element.

The prior art, which is made of the above mentioned configuration, has a problem that, once created, changing the antenna structure is impossible. Therefore the use of the invention is limited.

Because the prior art adopts a configuration using a conventional metallic micro strip line for the power supply line, etc., the invention has a problem that providing an antenna with a free and flexible structure is impossible.

Furthermore, while the prior art can dynamically change the antenna characteristic, no consideration is given to any microwave circuit other than the antenna. The invention has problems that it is impossible to change dynamically the characteristic of the microwave circuit other than the antenna. So it is impossible to provide a microwave circuit with a free and flexible structure.

In a microwave circuit, a micro strip line which is a flat circuit is often used to transmit microwaves. Since the micro strip line can form not only a transmission line but also functional elements such as a phase shifter, filter, matching circuit or flat antenna, the micro strip line is used for many radio transmission systems.

However, since such a circuit is composed of metal conductors and an insulating substrate, once designed and manufactured, the characteristics thereof are determined fixedly. It happens a case which is necessary to newly create a circuit or add a switching element such as a pin diode to the circuit to change the circuit characteristic. Even if the circuit characteristic is changed by using the switching element, the switching element only switches between fixed circuits, therefore discontinuous and limited characteristics are only obtained according to the respective switched circuits.

SUMMARY OF THE INVENTION

The present invention has been created in view of the above-described circumstances, and its object is to provide a new optical control electromagnetic wave circuit capable of forming and controlling an entire electromagnetic wave circuit such as configurations and shapes of a micro strip line and flat antenna elements in real time. Further its object is to provide a new optical control electromagnetic wave circuit capable of flexibly supporting a variety of applications in various frequency bands with a single system.

In order to realize this object to form the antenna, the present invention comprises, displaying means for displaying the shape of an electromagnetic wave circuit which operates as an antenna; electromagnetic wave circuit forming means placed facing the displaying means and provided with a photoconductive layer. It forms an electromagnetic wave circuit according to the shape of the electromagnetic wave circuit displayed on the displaying means. Further it comprises light-shielding means made of a material provided with permeability with respect to electromagnetic waves processed by the electromagnetic wave circuit formed by the electromagnetic wave circuit forming means for shielding external light incident upon the electromagnetic wave circuit forming means.

The present invention as described above adopts a configuration providing the displaying means connected to a computer apparatus, etc. so that the displaying means displays the shape of an electromagnetic wave circuit that operates as an antenna to be provided according to a display control signal output from the computer apparatus, etc.

In response to the display of the shape of this electromagnetic wave circuit operating as an antenna, the shape of this electromagnetic wave circuit is mapped into the photoconductive layer of the electromagnetic wave circuit forming means. This forms the electromagnetic wave circuit operating as an antenna.

Further, as the light-shielding means is provided, it is ensured to map the shape of the electromagnetic wave circuit operating as an antenna into the photoconductive layer. The light-shielding means is made of a material of permeability with respect to electromagnetic waves processed by the electromagnetic wave circuit operating as an antenna, so it is ensured the operation of the electromagnetic wave circuit to operate as an antenna to be provided.

As described above, the present invention adopts a configuration to provide an electromagnetic wave circuit forming means composed of a transparent substrate comprising a transparent grounded conductive layer on the surface facing the displaying means and comprising photoconductive layer on the surface opposite thereto. The shape of the electromagnetic wave circuit operating as an antenna displayed on the displaying means is mapped into the photoconductive layer of the electromagnetic wave circuit forming means. Thus with the present invention, the electromagnetic wave circuit operating as an antenna can be changed dynamically by changing the shape of electromagnetic wave circuit displayed on the displaying means. Like this, any electromagnetic wave circuit can be realized freely and flexibly.

Furthermore, in order to realize this object to form a general electromagnetic circuit, the present invention provides displaying means for displaying the shape of an electromagnetic wave circuit; electromagnetic wave circuit forming means comprising a photo conductive layer which is placed facing the displaying means and forms an electromagnetic wave circuit according to the shape of the electromagnetic wave circuit displayed on the displaying means; and light-shielding means for shielding external light incident upon the electromagnetic wave circuit forming means.

The present invention as described above adopts a configuration with the displaying means connected to a computer apparatus, etc. so that the displaying means displays the shape of the electromagnetic wave circuit required to be formed according to a display control signal output from the computer apparatus etc.

In response to the display of the shape of this electromagnetic wave circuit, the shape of this electromagnetic wave circuit is mapped into the photoconductive layer of the electromagnetic wave circuit forming means. Like this the required electromagnetic wave circuit is provided with these means.

Further as the light-shielding means is provided, it is ensured to map the shape of the electromagnetic wave circuit into the photoconductive layer.

As shown above, the present invention adopts a configuration comprising electromagnetic wave circuit forming means, which comprises a transparent substrate composing a transparent grounded conductive layer on the surface facing the displaying means and comprising a photoconductive layer on the surface opposite thereto. Further the present invention can comprise the electromagnetic wave circuit forming means composed of a triplet layer structure. The shape of the electromagnetic wave circuit displayed on the displaying means is mapped into the photoconductive layer of the electromagnetic wave circuit forming means to form the electromagnetic wave circuit. In the case of the triplet layer structure, an electromagnetic wave circuit of low loss can be realized. Like this, the present invention can dynamically change the electromagnetic wave circuit by changing the shape of the electromagnetic wave circuit displayed on the displaying means, Thus any electromagnetic wave circuit can be realized freely and flexibly.

Therefore, the present invention can form and control an entire electromagnetic wave circuit such as configurations and shapes of a micro strip line and flat antenna elements in real time and flexibly support a variety of applications of a variety of frequency bands with a single system.

The objects, advantages and features of the present invention will be more clearly understood by referencing the following detailed disclosure and the accompanying drawings.

DETAILED DESCRIPTION OF THE PREFERRED EMBODIMENTS

The present invention will be explained in detail in the following according to embodiments applied to a microwave circuit operating as an antenna.

Figure 1:
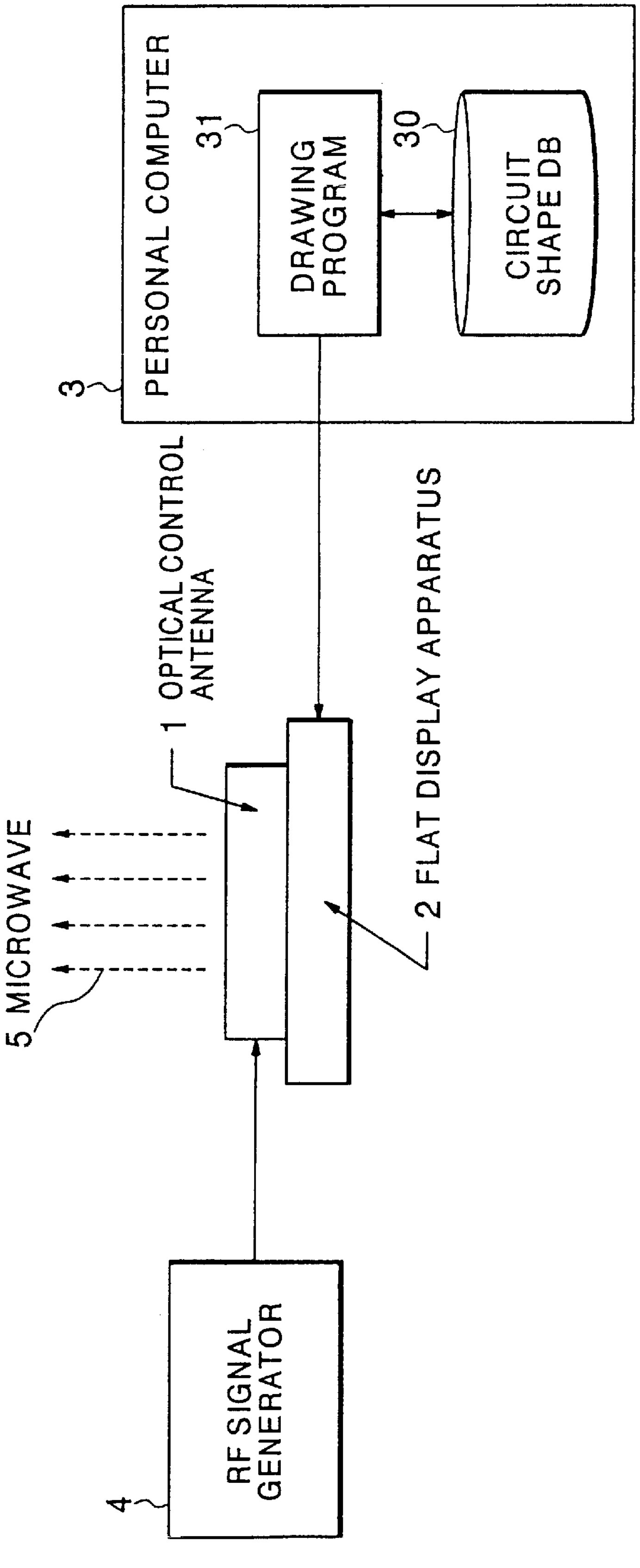
FIG. 1 is an embodiment of an optical control antenna according to the present invention.

FIG. 1 shows an embodiment of an optical control antenna 1 according to the present invention. The optical control antenna 1 according to the present invention shown in this drawing is placed on a flat display apparatus 2 connected to a personal computer 3, receives an RF signal 7 from an RF signal generator 4 and generates a microwave 5.

Figure 2:
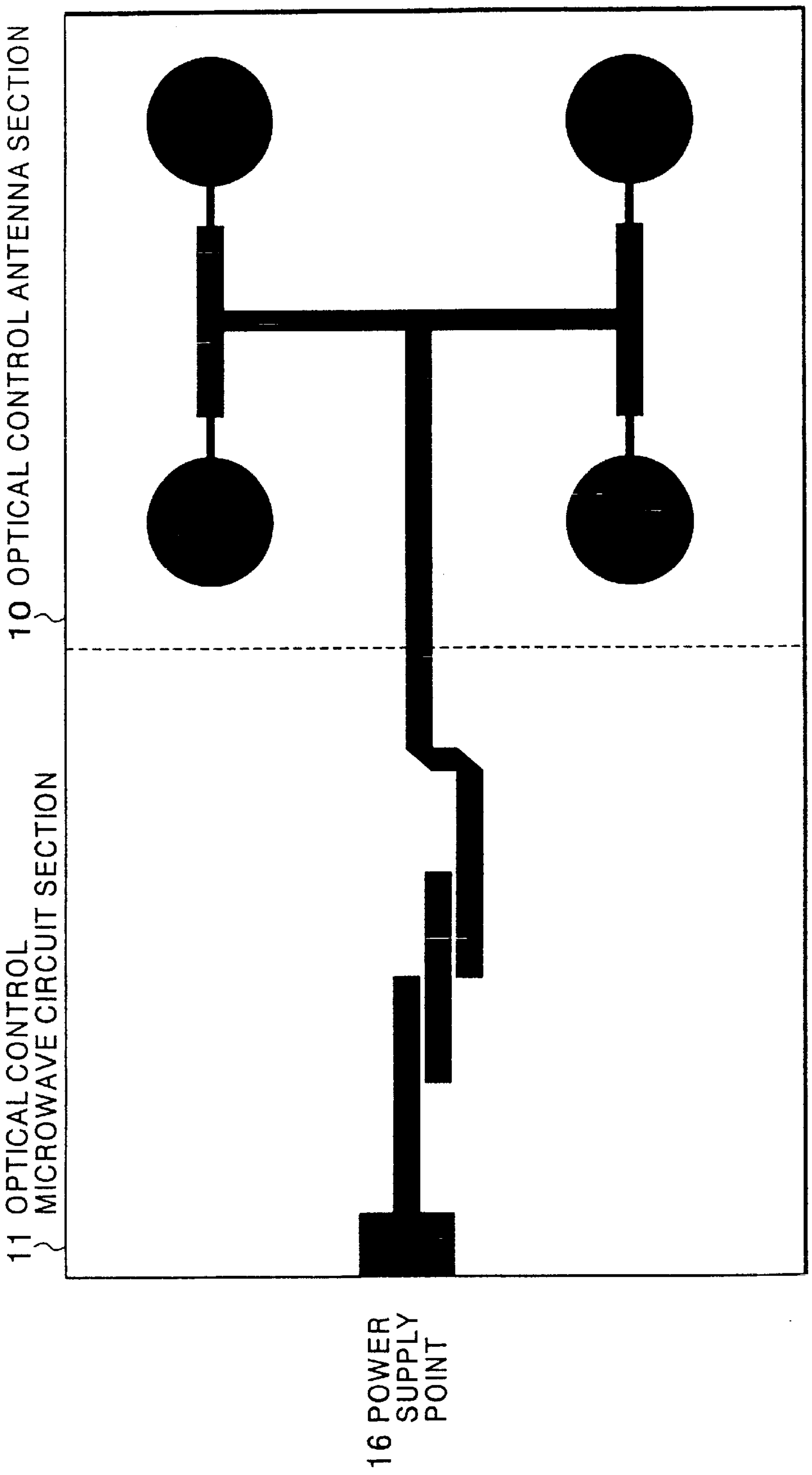
FIG. 2 is an embodiment of a circuit configuration of the optical control antenna according to the present invention.

The optical control antenna 1 is composed, for example as shown in FIG. 2, of an optical control antenna section 10 that operates as an antenna and an optical control microwave circuit section 11, which is a microwave circuit, that is located on the power supply side of the optical control antenna section 10 and performs predetermined microwave circuit processing (microwave circuit processing such as a phase shifter, filter and attenuator, etc.).

FIG. 2 shows an example with only one power supply point 16, but a plurality of power supply points may be provided in the present invention.

Here, according to this embodiment, the personal computer 3 is provided with a circuit shape database 30 that stores various shapes of microwave circuits used as the circuit shapes of the optical control antenna section 10 and optical control microwave circuit section 11, and a drawing program 31 that draws the shapes of the microwave circuits stored in the circuit shape database 30 on the flat display apparatus 2.

Figure 3:
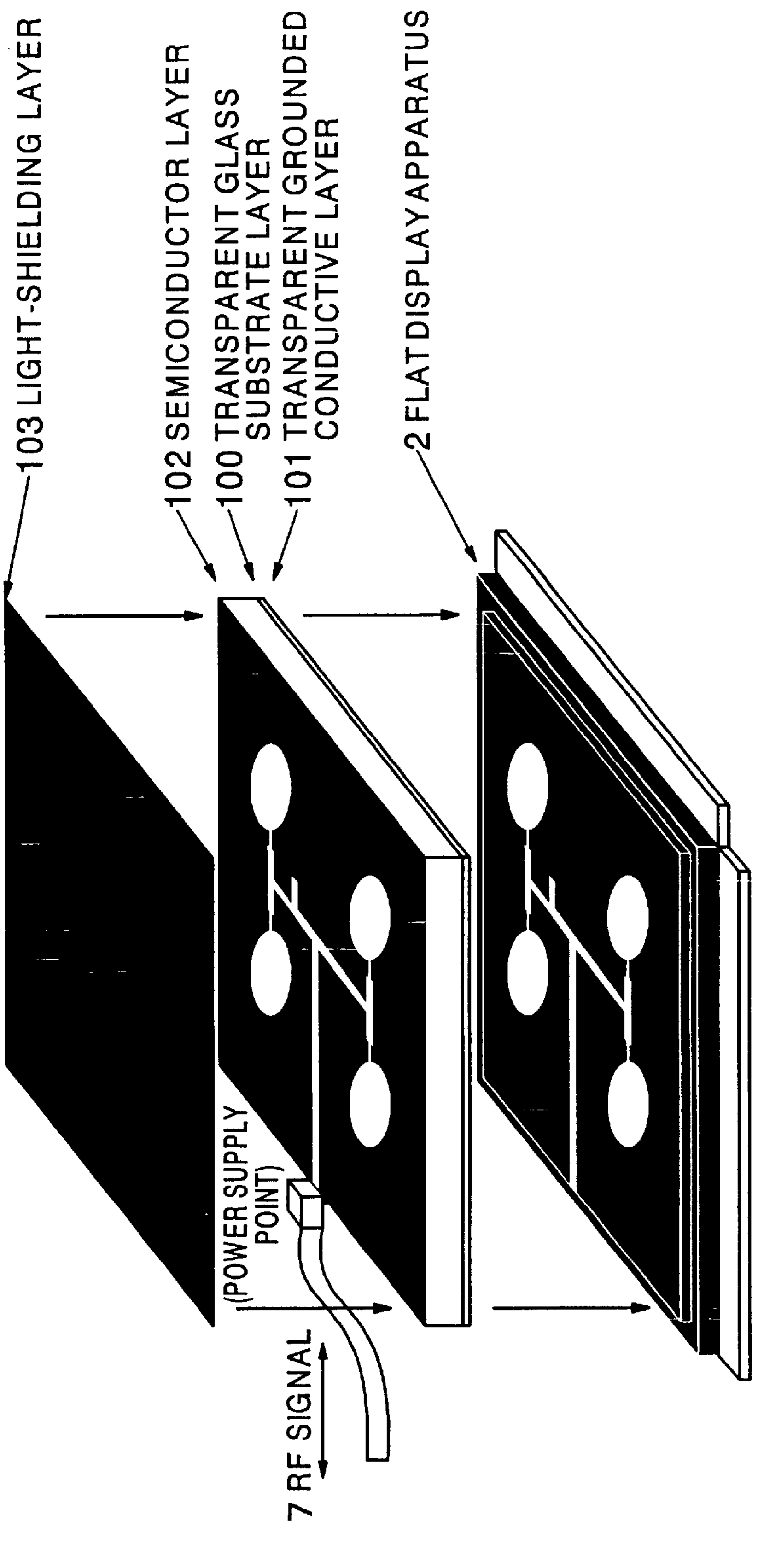
FIG. 3 is an embodiment of a laminated structure of the optical control antenna according to the present invention.

FIG. 3 illustrates an embodiment of a laminated structure of the optical control antenna 1 according to the present invention.

As shown in this drawing, the optical control antenna 1 according to the present invention has a structure of (1) a transparent glass substrate layer 100 which a transparent grounded conductive layer 101 such as an ITO or Ag thin film is formed on the surface facing the flat display apparatus 2 and which a photoconductive semiconductor layer 102 is formed on the opposite side, laminated on the flat display apparatus 2, and (2) a light-shielding layer 103 for shielding external light incident upon the semiconductor layer 102, laminated on the transparent glass substrate layer 100.

Here, the transparent grounded conductive layer 101 on the transparent glass substrate layer 100 is formed, for example, by means of vapor deposition and the semiconductor layer 102 on the transparent glass substrate layer 100 is formed, for example, by means of coating.

In FIG. 3, assuming a configuration mounting only the optical control antenna section 10 and not mounting the optical control microwave circuit section 11, a triplet structure to provide a microwave circuit with small transmission loss is not used.

Figure 4A:
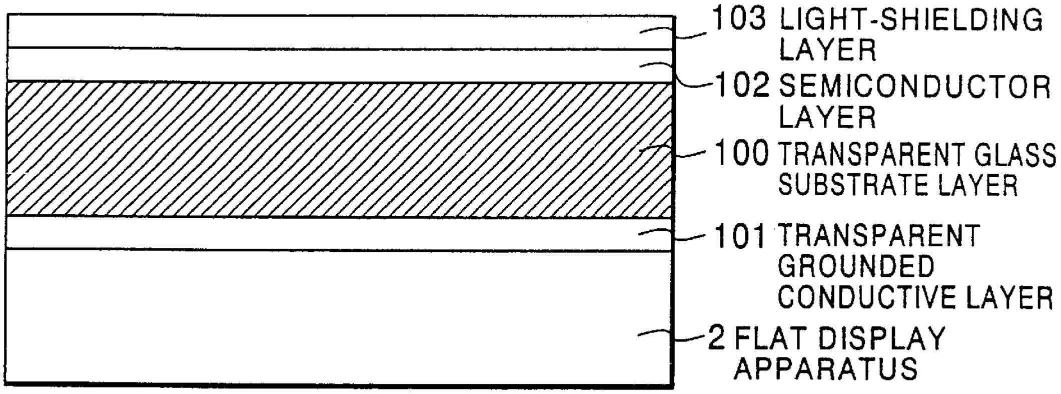
FIG. 4A is an embodiment of a laminated structure of an optical control antenna section and an optical control microwave circuit section according to the present invention.

On the contrary, when the optical control microwave circuit section 11 and the optical control antenna section 10 are mounted, the section providing the optical control antenna section 10 has the laminated structure as shown in FIG. 3 which is enable to emit microwaves as shown in FIG. 4A. Moreover, it is desirable to adopt a triplet structure with small transmission loss for the section providing the optical control microwave circuit section 11. Therefore it is better to provide a laminated structure as shown in FIG. 4B for forming the optical control microwave circuit section 11.

Figure 4B:
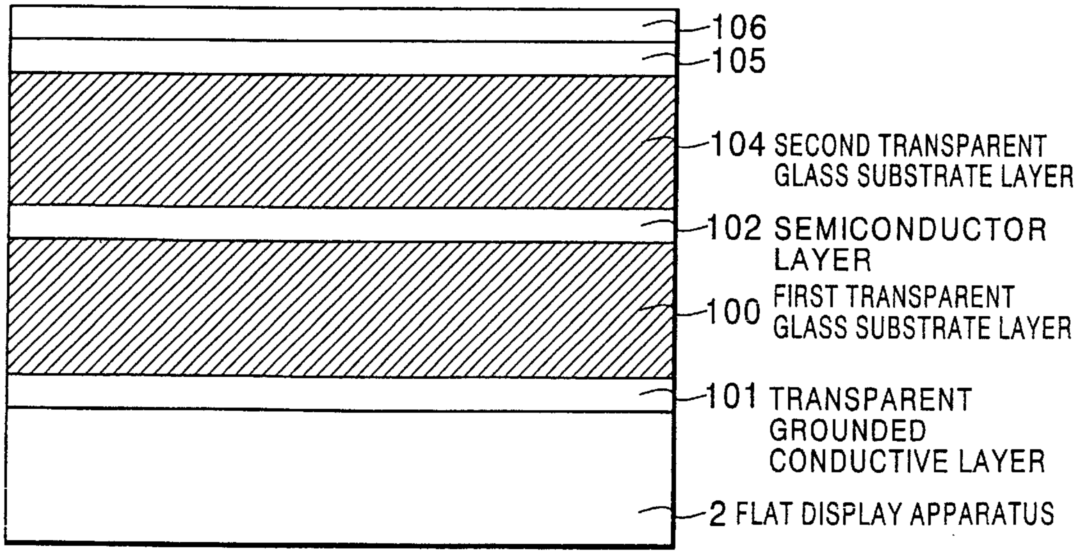
FIG. 4B is an embodiment of a laminated structure of triplet type of an optical control antenna section and an optical control microwave circuit section according to the present invention.

As shown in FIG. 4B, it is desirable for the part of the optical control microwave circuit section 11 to have a triplet structure of (1) a transparent glass substrate layer 100 which a transparent grounded conductive layer 101 is formed on the surface facing the flat display apparatus 2 and which a photoconductive semiconductor layer 102 is formed on the opposite side, laminated on the flat display apparatus 2 and (2) a second transparent glass substrate layer 104 which a second transparent grounded conductive layer 105 is formed on the surface opposite to the semiconductor layer 102, laminated on the transparent glass substrate layer 100, (3) a light-shielding layer 106 for shielding external light incident upon the semiconductor layer 102, laminated on the second transparent glass substrate layer 104.

Here, while the light-shielding layer 103 used to provide the optical control antenna section 10 needs to have a characteristic of permeability with respect to microwaves in order to realize the function as an antenna, the light-shielding layer 106 used to provide the optical control microwave circuit section 11 needs not to have a characteristic of permeability with respect to microwaves. Because of this, it is also possible to use a metallic package which is not a laminated structure, etc. as the light-shielding layer 106 for the optical control microwave circuit section 11.

Then, the second transparent glass substrate layer 104 used to realize the optical control microwave circuit section 11 is not needed essentially to be transparent and the second transparent grounded conductive layer 105 for the optical control microwave circuit section 11 is not needed essentially to be transparent.

When the optical control antenna 1 according to the present invention constructed as described above operates, the drawing program 31 provided for the personal computer 3 reads the shapes of the microwave circuits using in the optical control antenna section 10 and optical control microwave circuit section 11 from the circuit shape database 30 and draws those shapes of the microwave circuits on the flat display apparatus 2.

The shape of the microwave circuit displayed on this flat display apparatus 2 is irradiated onto the semiconductor layer 102 of the transparent glass substrate layer 100. In this way, a conductive pattern according to the shape of the microwave circuit is formed on the semiconductor layer 102. Like this, the circuit configurations of the optical control antenna section 10 and the optical control microwave circuit section 11 are realized.

Further providing the light-shielding layers 103 and 106 ensures the formation of conductive patterns on the semiconductor layer 102 according to the shape of the microwave circuit displayed on the flat display apparatus 2.

Though not shown in FIG. 3, this embodiment also provides a structure of shielding external light incident from a side of the transparent glass substrate layer 100 and the second transparent glass substrate layer 104.

Thus, since the optical control antenna 1 according to the present invention provides the optical control antenna section 10 and the optical control microwave circuit section 11 according to the shape of the microwave circuit displayed on the flat display apparatus 2, it is possible to dynamically change the circuit configurations of the optical control antenna section 10 and the optical control microwave circuit section 11. Thus the present invention freely and flexibly provides a circuit configuration only by changing the shape of the microwave circuit displayed on the flat display apparatus 2.

Figure 5:
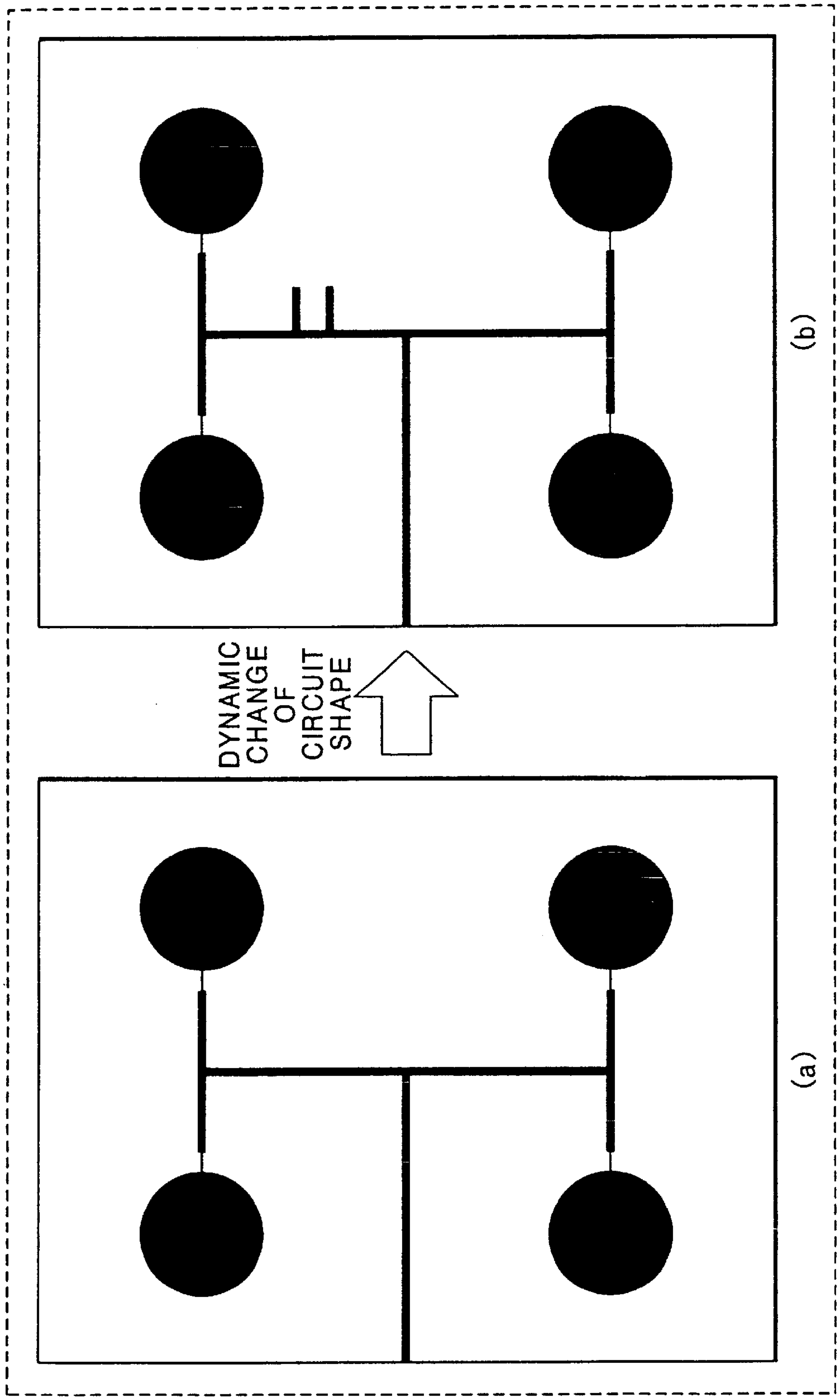
FIG. 5 illustrates the optical control antenna section according to the present invention.

FIG. 5 shows a dynamic change of example. FIG. (a) shows a micro wave circuit which is an original pattern in the change. FIG. (b) shows a circuit pattern changed from the pattern in FIG. 5(*a*).

The shape of the microwave circuit comprising four patch antennas is displayed on the flat display apparatus 2 like shown in FIG. 5(*a*). When providing the optical control antenna 1 of the microwave circuit shown in FIG. 5(*a*), and further adding an open stub to the microwave circuit as shown in FIG. 5(*b*), the shape of the open stub is added to the shape of the microwave circuit shown in FIG. 5(*a*) displayed on the flat display apparatus 2 as shown in FIG. 5(*b*), thus the circuit configuration of the microwave circuit to the optical control antenna 1 comprising the microwave circuit configuration shown in FIG. 5(*b*) can be formed.

Figure 6:
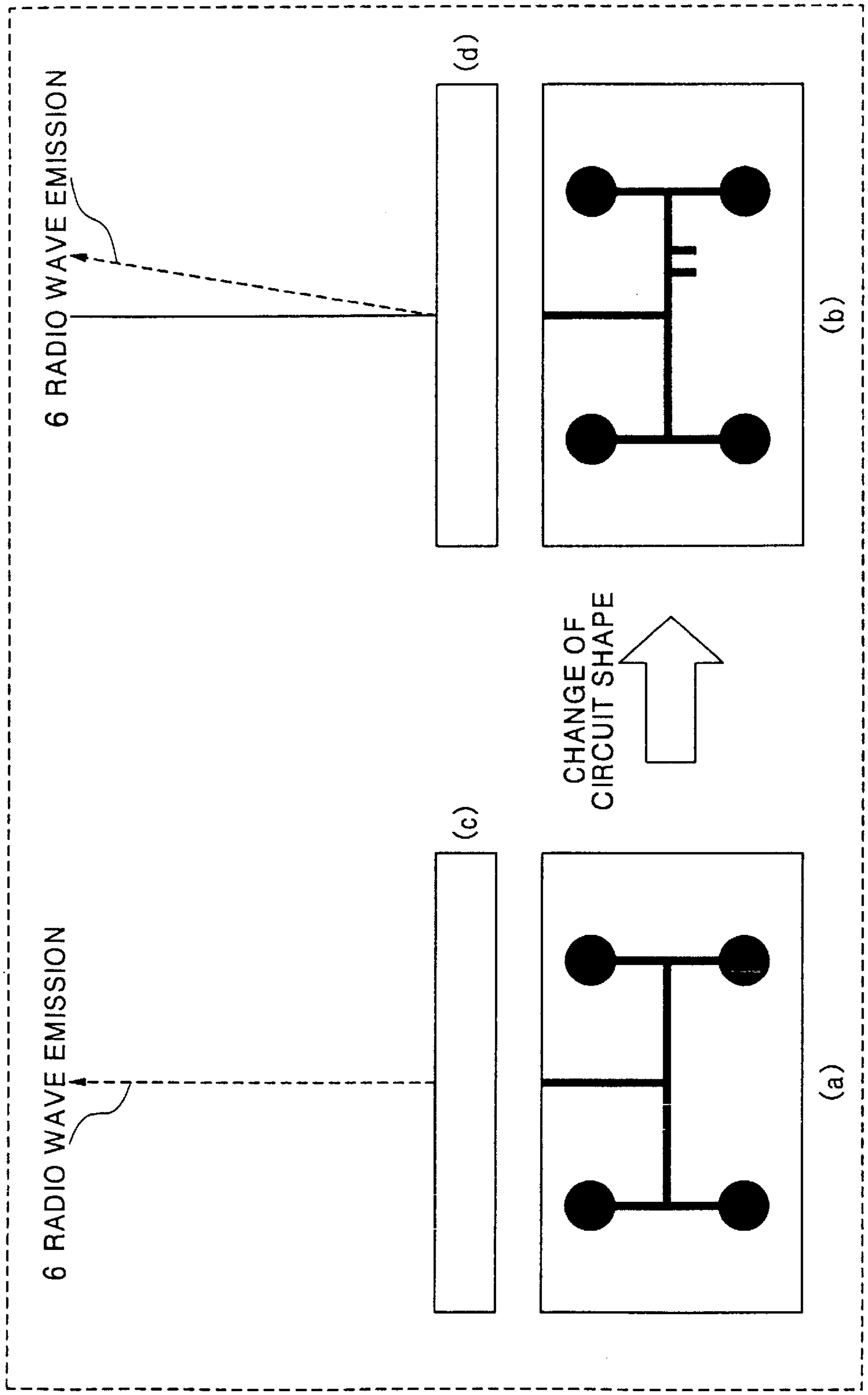
FIG. 6 illustrates the optical control antenna section according to the present invention.

When the microwave circuit is changed like shown in FIG. 5, power supply to the two patch antennas located on the open stub side is delayed, so it possible to dynamically change the emission direction of microwaves emitted from the four patch antennas as shown in FIG. 6. In FIG. 6, FIG. 6(*a*) shows a microwave circuit of the original in the change. FIG. 6(*b*) shows a circuit which is changed from the original pattern of FIG. 6(*a*). FIG. 6(*c*) is a cross sectional view of FIG. 6(*a*). FIG. 6(*c*) explains the radiation direction of radio wave emission 6 from the antenna pattern of FIG. 6(*a*). FIG. 6(*d*) is a cross sectional view of FIG. 6(*b*). FIG. 6(*d*) shows the radiation direction of radio wave emission 6 from the antenna of FIG. 6(*b*), which is shown with a dotted arrow.

Thus, the optical control antenna 1 according to the present invention can change dynamically the circuit configurations of the optical control antenna section 10 and the optical control microwave circuit section 11 by changing the shape of the microwave circuit displayed on the flat display apparatus 2. Like this, the present invention brings a great effect to realize a voluntary electromagnetic wave circuit.

Figure 7:
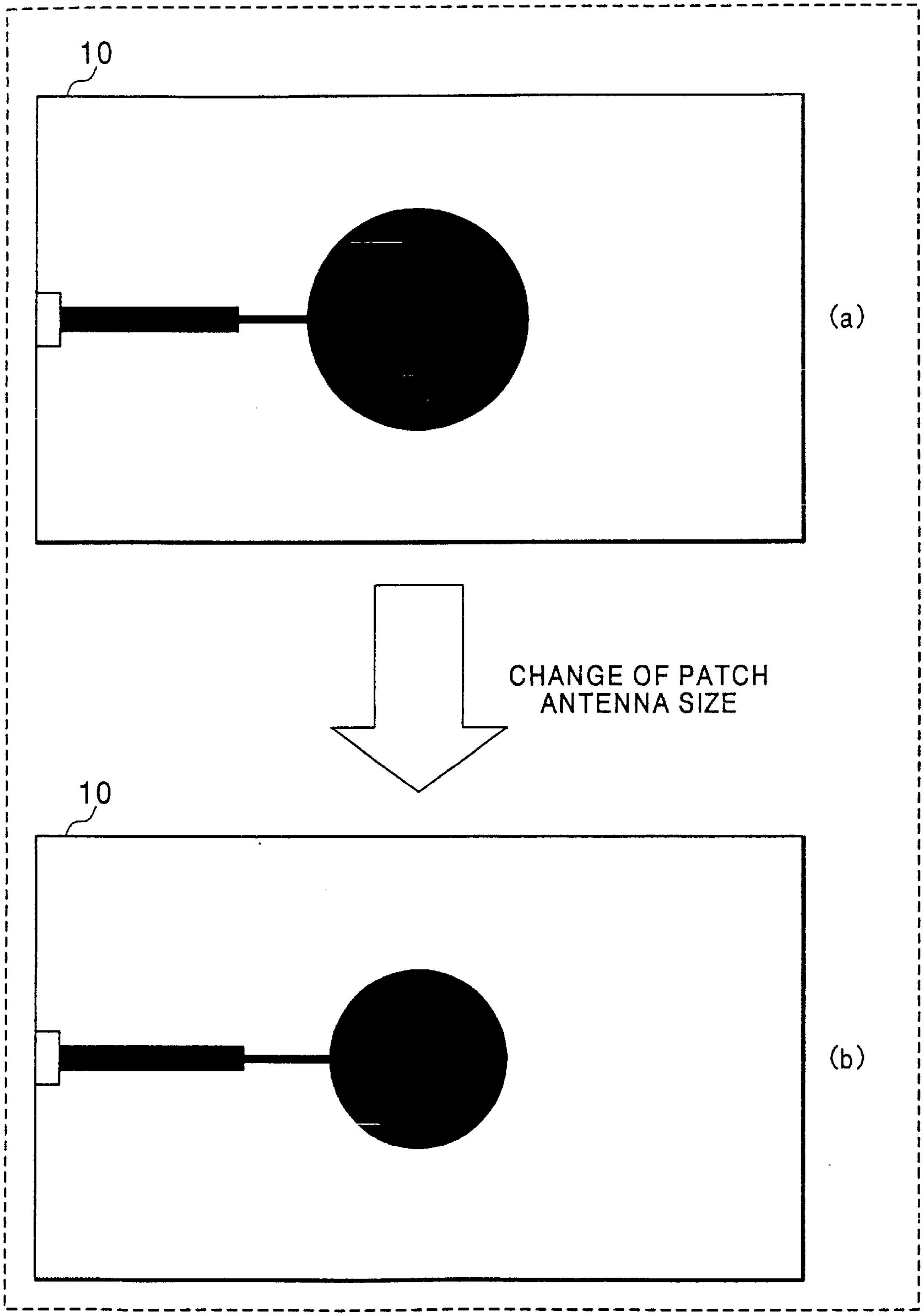
FIG. 7 illustrates the optical control antenna section according to the present invention.

The present invention can be applied to compose any kinds of plane patterns which can form on the semiconductor layer with the display unit. For example the plane antenna is a form of a slot antenna, or a patch antenna or another form of the plane antenna other than the patch antenna. FIG. 7 shows a change of a patch antenna size. FIG. 7(*a*) shows a patch antenna of original pattern in the change. FIG. 7(*b*) shows a patch antenna pattern changed from the pattern of FIG. 7(*a*).

For example, as shown in FIG. 7, changing the size of the patch antenna in the optical control antenna section 10, its resonance frequency can be changed dynamically.

Figure 8:
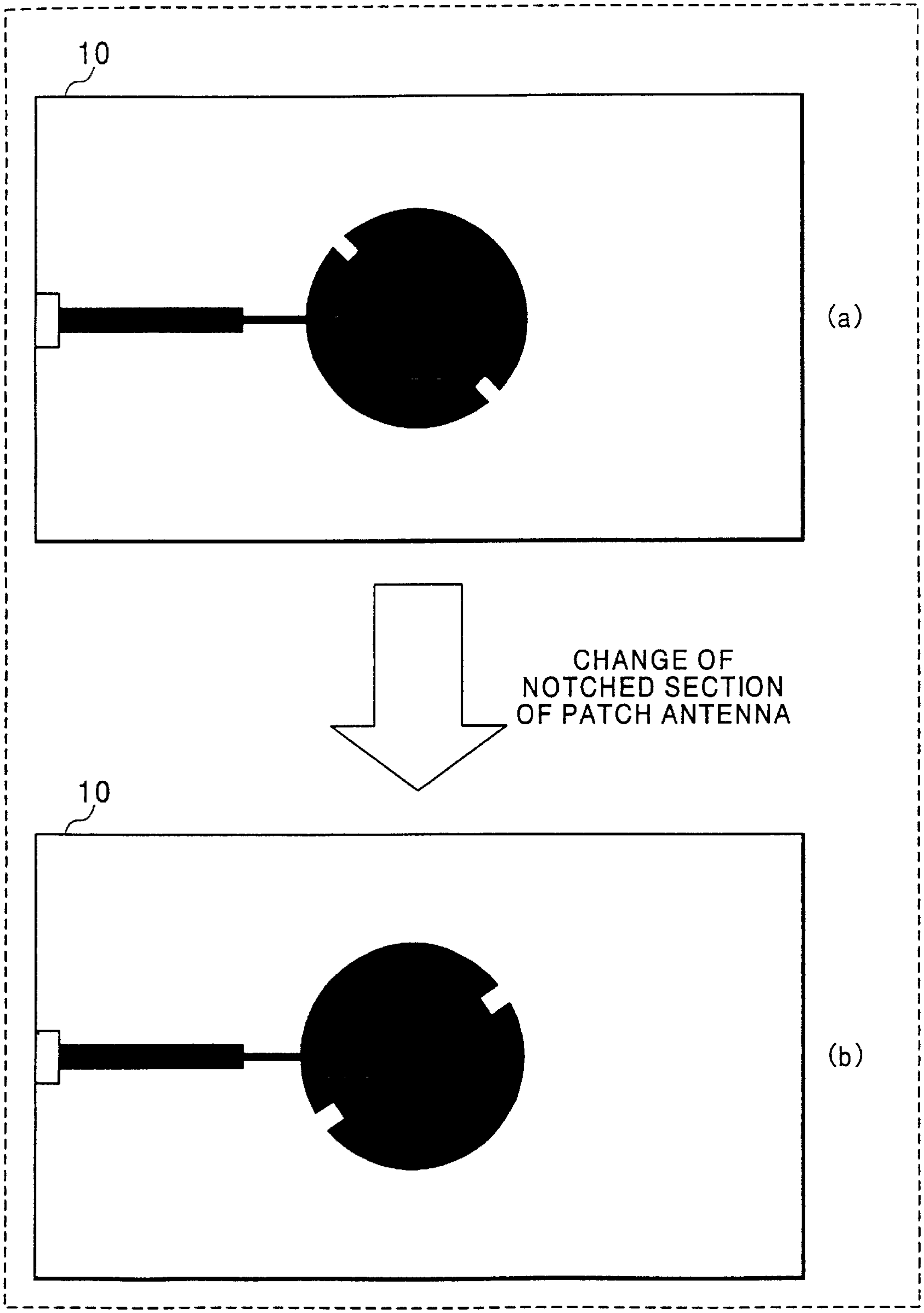
FIG. 8 illustrates the optical control antenna section according to the present invention.

FIG. 8 shows a change of notched sections of a patch antenna. FIG. 8(*a*) shows the notched sections of an original pattern in the change. FIG. 8(*b*) shows the notched sections of the patched antenna changed from the notched patterns of FIG. 8(*a*).

Furthermore, as shown in FIG. 8, changing the location of a perturbation element (notched part) of the patch antenna constituting the optical control antenna section 10, a direction of circular polarization can be changed dynamically from a clockwise circular polarization to a counterclockwise circular polarization, for example.

Figure 9:
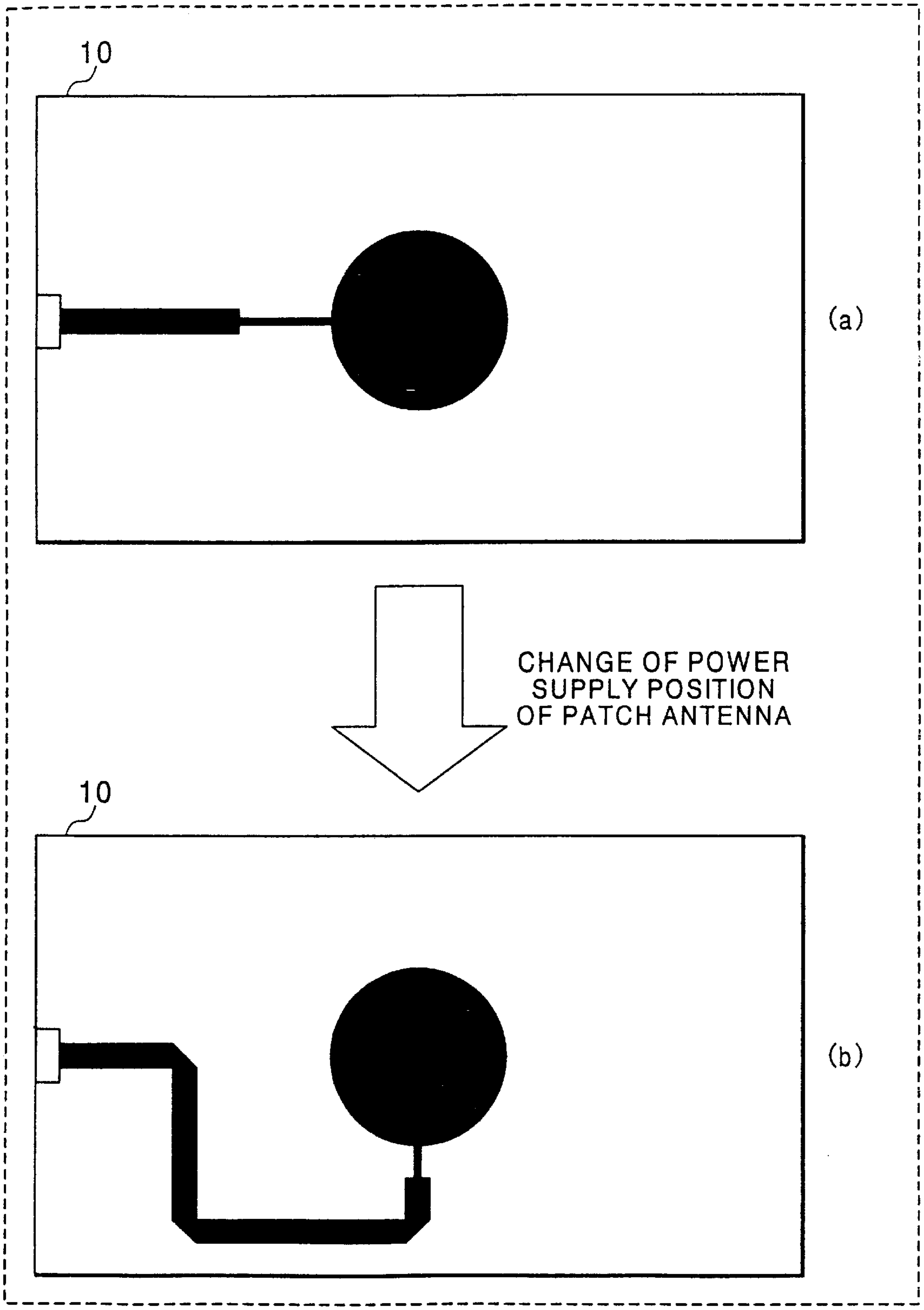
FIG. 9 illustrates the optical control antenna section according to the present invention.

FIG. 9 shows a change of a power supply antenna of a patch antenna. FIG. 9(*a*) shows the patched antenna of original pattern in the change. FIG. 9(*b*) shows the patched antenna changed from the pattern of FIG. 9(*a*).

Furthermore, as shown in FIG. 9, changing the location of the power supply to the patch antenna in the optical control antenna section 10, a polarization plane of linear polarization can be changed.

Figure 10:
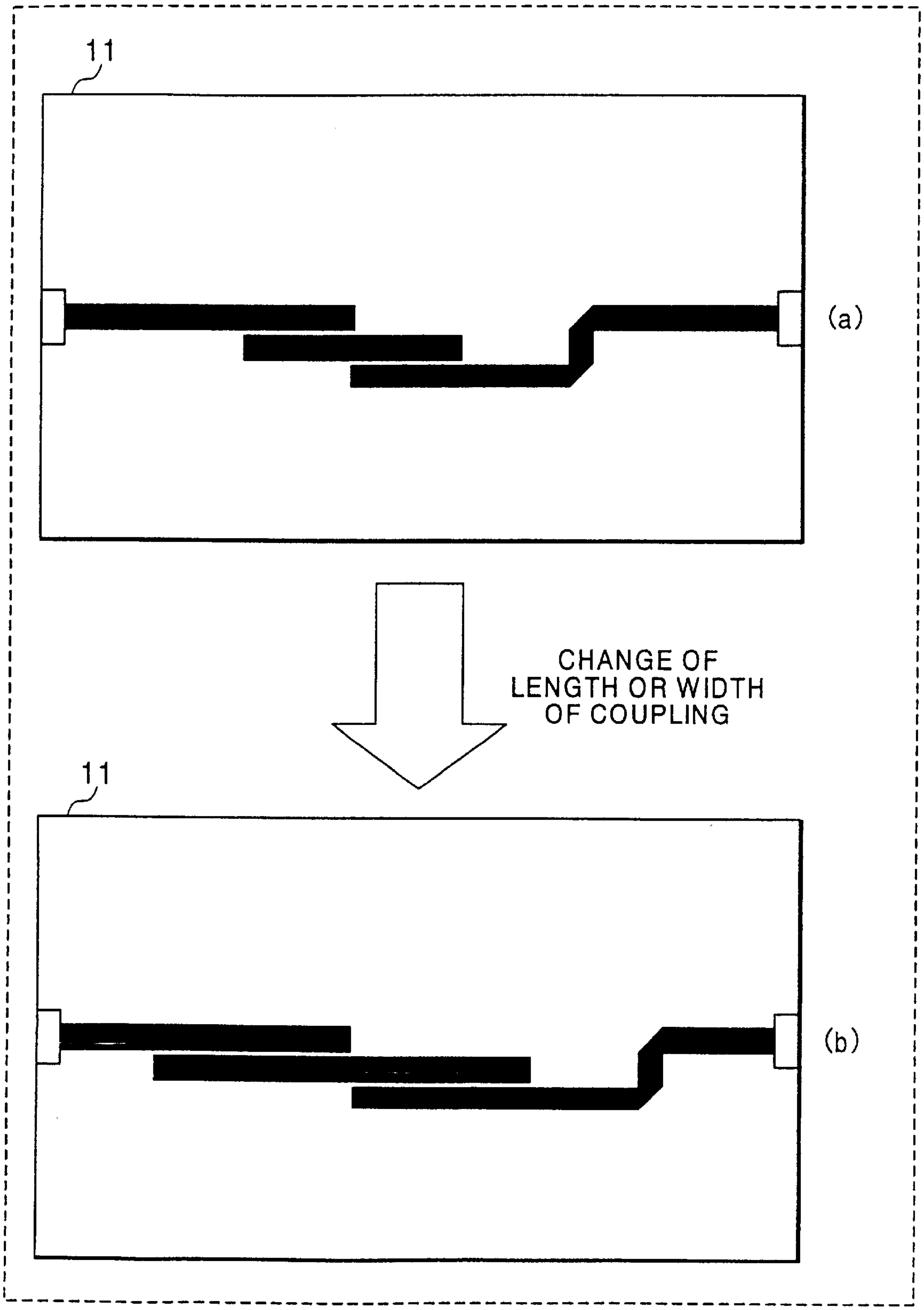
FIG. 10 illustrates the optical control microwave circuit section according to the present invention.

FIG. 10 shows a change of a length or width of coupling. FIG. 10(*a*) shows a microwave circuit pattern of an original pattern in the change. FIG. 10(*b*) shows a microwave pattern changed from the circuit pattern of FIG. 10(*a*).

Furthermore, as shown in FIG. 10, changing the length of coupling or the width of the micro strip line of the band pass filter in the optical control microwave circuit section 11, the filter characteristic can be changed dynamically.

Figure 11:
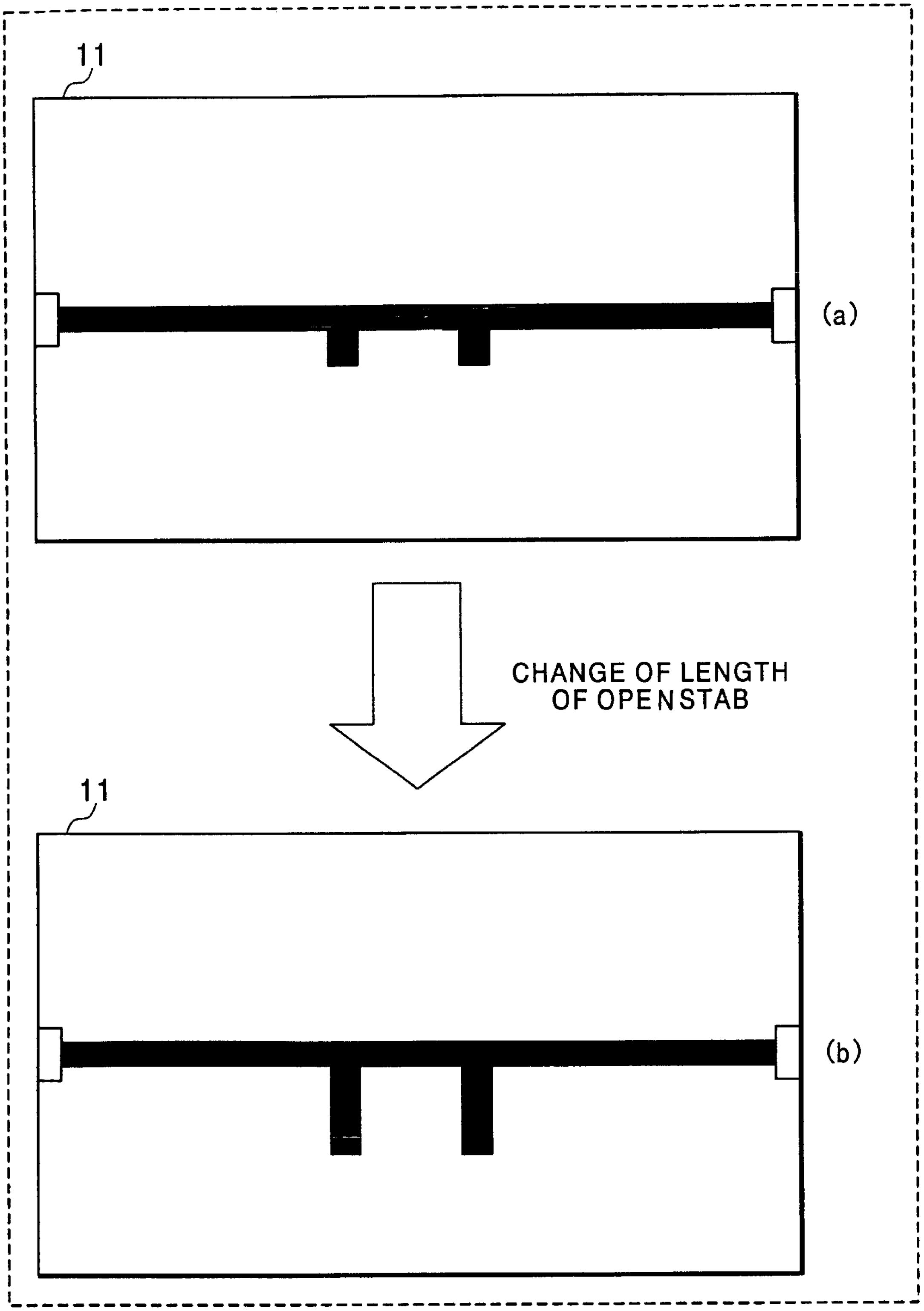
FIG. 11 illustrates the optical control microwave circuit section according to the present invention.

FIG. 11 shows a change of an open stub of a microwave circuit. FIG. 11(*a*) shows the open stub of an original pattern in the change. FIG. 11(*b*) shows the open stub changed from the open stub of FIG. 11(*a*).

Furthermore, as shown in FIG. 11, changing the length of the open stub of the phase shifter in the optical control microwave circuit section 11, the amount of phase shift can be changed dynamically.

Figure 12:
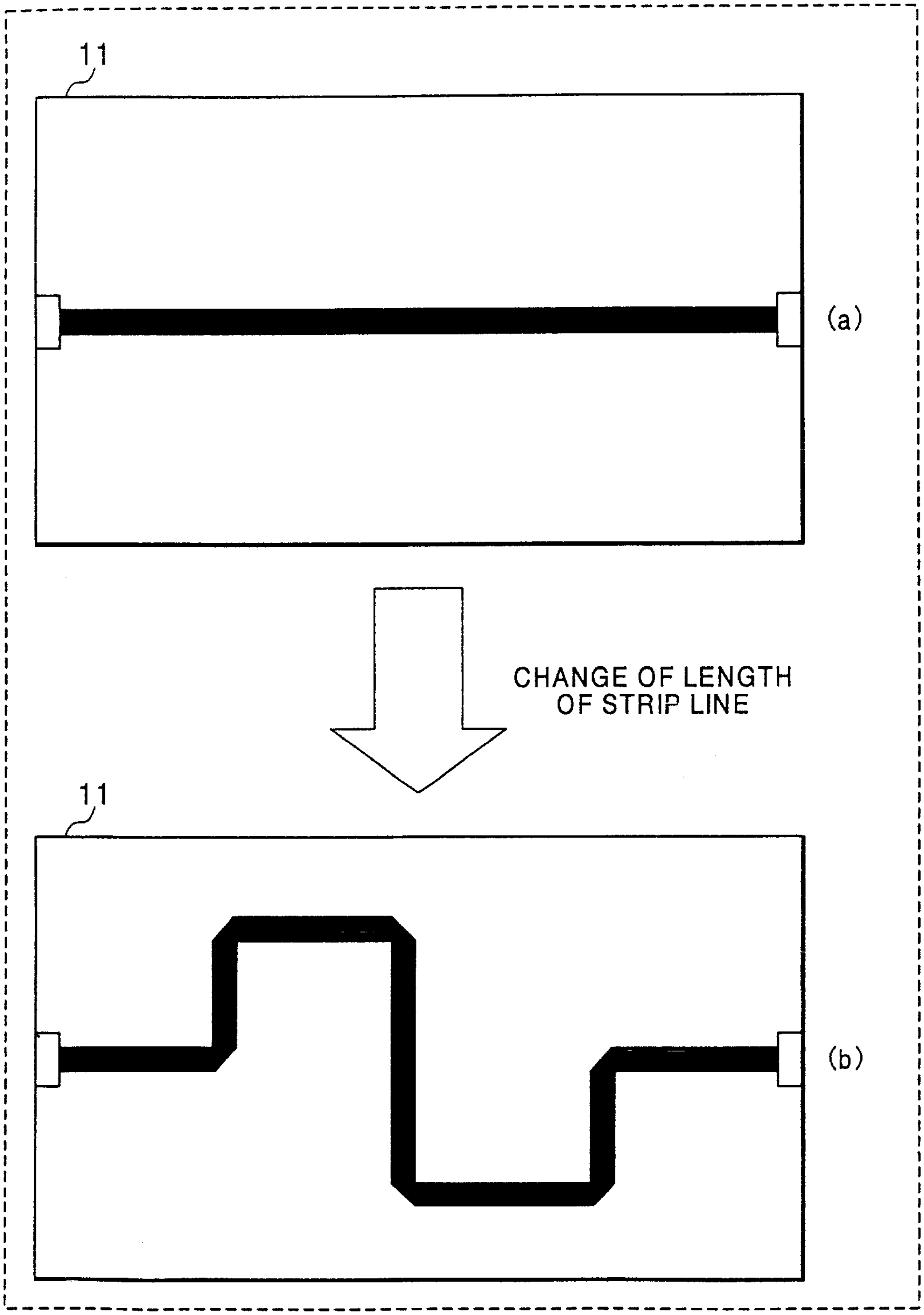
FIG. 12 illustrates the optical control microwave circuit section according to the present invention.
Figure 13A:
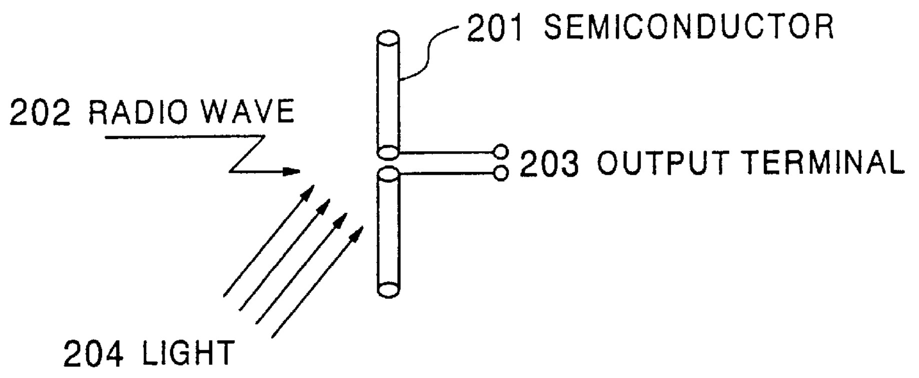
FIG. 13A illustrates a prior art.
Figure 13B:
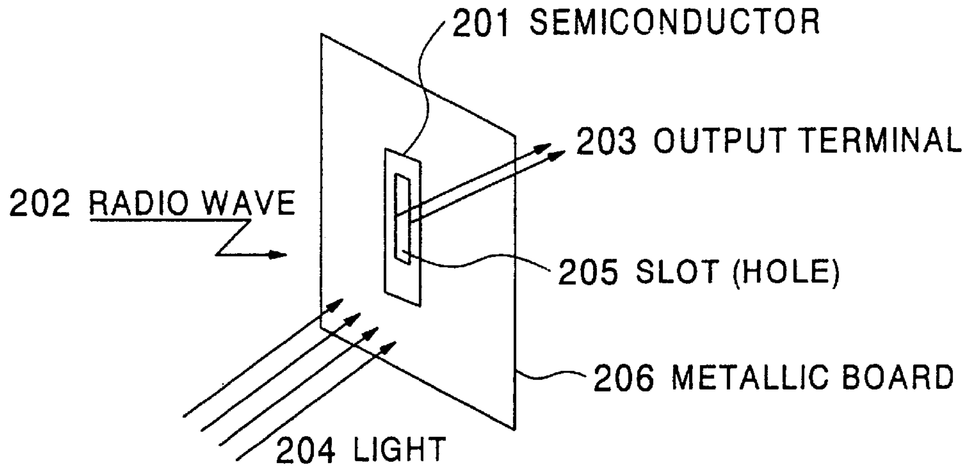
FIG. 13B illustrates a prior art.
Figure 13C:
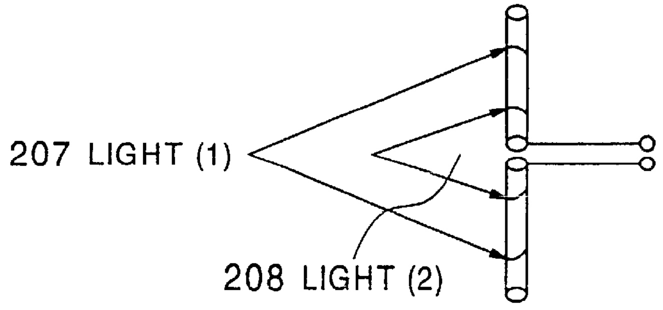
FIG. 13C illustrates a prior art.
Figure 14:
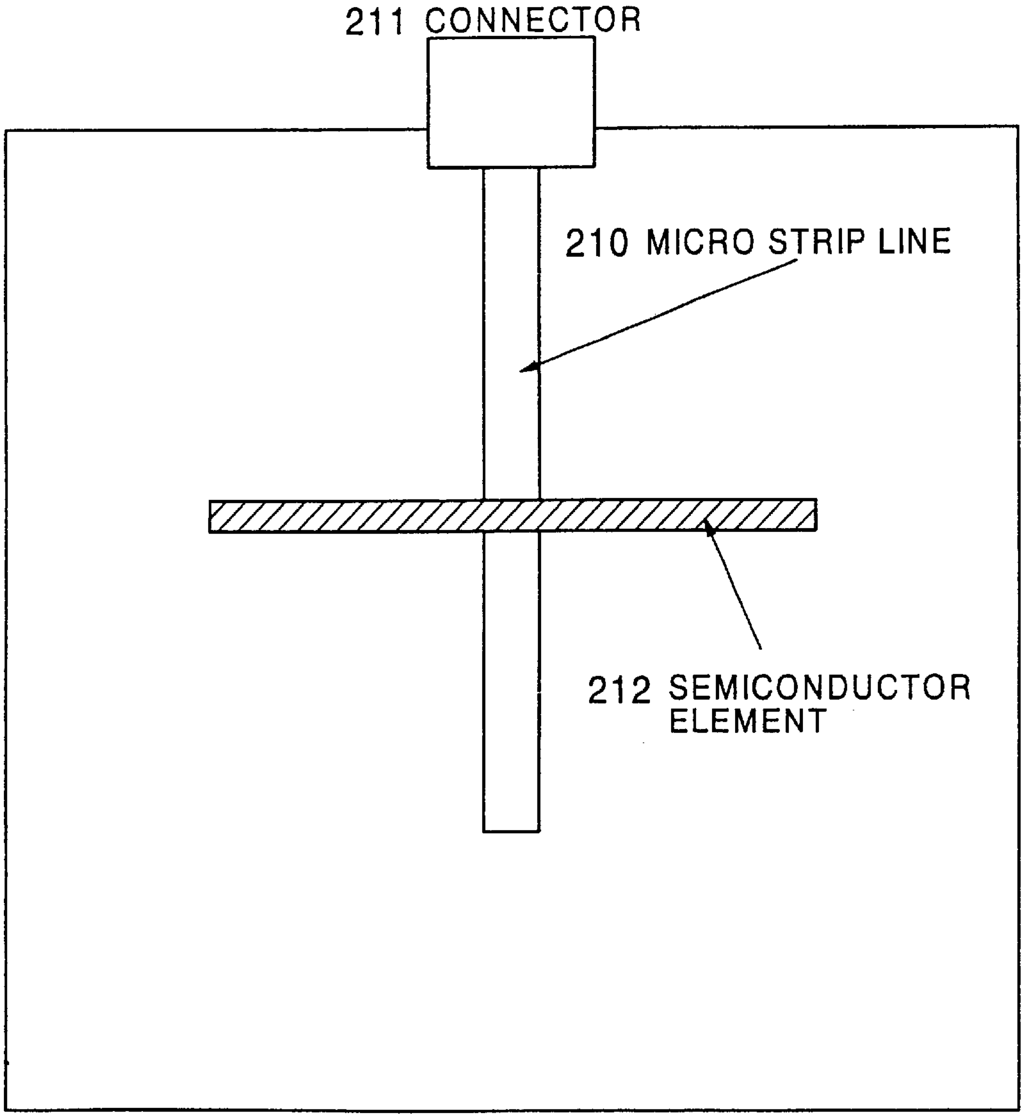
FIG. 14 illustrates a prior art.

FIG. 12 shows a change of length of a strip line of a microwave circuit. FIG. 12(*a*) shows the strip line of an original pattern in the change. FIG. 12(*b*) shows a strip line changed from the strip line of FIG. 12(*a*).

Furthermore, as shown in FIG. 12, changing the length of the micro strip line of the attenuator in the optical control microwave circuit section 11, the amount of attenuation can be changed dynamically.

The shape of the microwave circuit displayed on the flat display apparatus 2 can be changed freely and flexibly with the drawing program 31, etc. provided for the personal computer 3, etc. Thus, the present invention can realize also freely and flexibly an extremely complex microwave circuit.

Though not explained in the foregoing embodiments, a conductivity of a conductive pattern formed on the semiconductor layer 102 can be changed by partially changing brightness of the shape of the microwave circuit displayed on the flat display apparatus 2 or partially changing the display color of the shape of the microwave circuit. Thus, the characteristics of the microwave circuit can be changed dynamically without changing the shape of the microwave circuit displayed on the flat display apparatus 2.

The present invention has been explained according to the foregoing embodiments illustrated with the attached drawings, but the present invention is not limited to the embodiments. For example, the embodiments use the flat display apparatus 2, but a non-flat shaped display apparatus may be used in stead of the flat display apparatus 2.

Furthermore, the present invention has been explained by the embodiments applied to a microwave circuit, but the present invention can be applied to electromagnetic waves in other regions such as millimeter waves or submillimeter waves.

As described above, the present invention can provide the electromagnetic wave circuit by displaying the shape of an electromagnetic wave circuit to be formed on a display apparatus, so it can provide freely and flexibly an electromagnetic wave circuit and dynamically change the configuration of the electromagnetic wave circuit.

Thus, the present invention can form and control an entire electromagnetic wave circuit such as configurations and shapes, etc. of a micro strip line and flat antenna elements in real time, so it can support flexibly a variety of applications in a variety of frequency bands with a single system.

Moreover, a variety of new electromagnetic wave application systems which have been so far impossible using conventional electromagnetic wave circuits are realized according to the present invention.

The many features and advantages of the present invention are apparent from the detailed specification and, thus, it is intended by the appended claims to cover all such features and advantages of the invention which fall within the true spirit and scope of the invention. Further, since numerous modification and changes will readily occur to those skilled in the art, it is not desired to limit the invention to the exact construction and operation illustrated and described, and accordingly all suitable modification and equivalents falling within the scope of the invention may be included in the present invention.

What is claimed is:

1. An optical control electromagnetic wave circuit comprising:

displaying means for displaying the shape of an electromagnetic wave circuit;

electromagnetic wave circuit forming means, placed facing said displaying means and provided with a photoconductive layer, for forming an electromagnetic wave circuit according to the shape of the electromagnetic wave circuit displayed on said displaying means; and light-shielding means for shielding external light incident upon said electromagnetic wave circuit forming means.

2. An optical control electromagnetic wave circuit comprising:

a displaying unit displaying the shape of an electromagnetic wave circuit that operates as an antenna;

an electromagnetic wave circuit forming unit, placed facing said displaying unit and provided with a photoconductive layer, forming an electromagnetic wave circuit according to the shape of the electromagnetic wave circuit displayed on said displaying unit; and a light-shielding unit, comprising of a material provided with permeability with respect to electromagnetic waves processed by the electromagnetic wave circuit formed by said electromagnetic wave circuit forming unit, shielding external light incident upon said electromagnetic wave circuit forming unit.

3. An optical control electromagnetic wave circuit comprising:

a displaying unit displaying the shape of an electromagnetic wave circuit;

an electromagnetic wave circuit forming unit, placed facing said displaying unit and provided with a photoconductive layer, forming an electromagnetic wave circuit according to the shape of the electromagnetic wave circuit displayed on said displaying unit; and a light-shielding unit shielding external light incident upon said electromagnetic wave circuit forming unit.

4. The optical control electromagnetic wave circuit according to claim 3, wherein said displaying unit displays the shape of said electromagnetic wave circuit, according to a display control signal sent from a computer external to the displaying unit, and designs a specific structure of the electromagnetic wave circuit.

5. The optical control electromagnetic wave circuit according to claim 3, wherein the electromagnetic wave circuit forming unit forms an electromagnetic wave circuit comprising an open stub.

6. The optical control electromagnetic wave circuit according to claim 3, wherein the electromagnetic wave circuit forming unit forms an electromagnetic wave circuit comprising a plane antenna.

7. The optical control electromagnetic wave circuit according to claim 3, wherein the electromagnetic wave circuit forming unit forms an electromagnetic wave circuit comprising a perturbation element of a patch antenna.

8. The optical control electromagnetic wave circuit according to claim 3, wherein the electromagnetic wave circuit forming unit forms an electromagnetic wave circuit comprising a power supply line of a patch antenna.

9. The optical control electromagnetic wave circuit according to claim 3, wherein the electromagnetic wave circuit forming unit forms an electromagnetic wave circuit comprising a strip line.

10. The optical control electromagnetic wave circuit according to claim 6, wherein the plane antenna is a patch antenna.

11. The optical control electromagnetic wave circuit according to claim 6, wherein the plane antenna is a slot antenna.

12. An optical control electromagnetic wave circuit comprising:

a displaying unit displaying a shape of an electromagnetic wave circuit; and an electromagnetic wave circuit forming unit, placed facing said displaying unit and provided with a photoconductive layer, forming an electromagnetic wave circuit according to the shape of the electromagnetic wave circuit displayed on said displaying unit;

wherein the electromagnetic wave circuit forming unit changes a characteristic of an electromagnetic wave circuit by wholly or partially changing a brightness of a shape of a microwave circuit displayed on the display unit.

13. An optical control electromagnetic wave circuit comprising:

a displaying unit displaying a shape of an electromagnetic wave circuit; and an electromagnetic wave circuit forming unit, placed facing said displaying unit and provided with a photoconductive layer, forming an electromagnetic wave circuit according to the shape of the electromagnetic wave circuit displayed on said displaying unit, wherein the electromagnetic wave circuit forming unit changes a characteristic of an electromagnetic wave circuit by wholly or partially changing a display color of a shape of a microwave circuit.

14. An optical control electromagnetic wave circuit comprising:

a displaying unit displaying a shape of an electromagnetic wave circuit that operates as an antenna;

an electromagnetic wave circuit forming unit, placed facing said displaying unit and provided with a photoconductive layer, forming an electromagnetic wave circuit according to the shape of the electromagnetic wave circuit displayed on said displaying unit; and a light-shielding unit comprising a material having transparency with respect to electromagnetic waves processed by the electromagnetic wave circuit formed by said electromagnetic wave circuit forming unit, and shielding external light incident upon said electromagnetic wave circuit forming unit.

15. The optical control electromagnetic wave circuit according to claim 3, wherein said electromagnetic wave circuit forming unit has a structure forming a triplet electromagnetic wave circuit.

* * * * *

UNITED STATES PATENT AND TRADEMARK OFFICE

CERTIFICATE OF CORRECTION

PATENT NO. : 6,831,604 B2

DATED : December 14, 2004

INVENTOR(S) : Noriaki Obara

It is certified that error appears in the above-identified patent and that said Letters Patent is hereby corrected as shown below:

Column 9,
Line 22, change “of a material” to -- a material --.

Column 10,
Line 19, change “;” to -- , --.

Signed and Sealed this

Second Day of August, 2005

JON W. DUDAS
*Director of the United States Patent and Trademark Office*